United States Patent
Alexander

(10) Patent No.: US 7,545,131 B1
(45) Date of Patent: Jun. 9, 2009

(54) TRANSIENT PROCESSING MECHANISM FOR POWER CONVERTERS

(75) Inventor: Mark A. Alexander, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 153 days.

(21) Appl. No.: 11/376,887

(22) Filed: Mar. 16, 2006

Related U.S. Application Data

(60) Provisional application No. 60/723,282, filed on Oct. 3, 2005.

(51) Int. Cl.
G05F 1/00 (2006.01)
G05F 1/565 (2006.01)
H02M 3/335 (2006.01)

(52) U.S. Cl. ................ 323/284; 323/275; 323/285; 363/21.05

(58) Field of Classification Search ............ 363/42, 363/56.03, 65; 323/220, 222, 275, 282, 284; 327/100, 124, 172, 175
See application file for complete search history.

(56) References Cited

U.S. PATENT DOCUMENTS

| | | | | |
|---|---|---|---|---|
| 4,028,501 | A * | 6/1977 | Rittenhouse | 341/54 |
| 5,121,315 | A * | 6/1992 | Moriya | 363/65 |
| 5,742,151 | A * | 4/1998 | Hwang | 323/222 |
| 5,747,977 | A * | 5/1998 | Hwang | 323/284 |
| 5,798,635 | A * | 8/1998 | Hwang et al. | 323/222 |
| 5,847,549 | A * | 12/1998 | Dodson, III | 323/220 |
| 6,157,222 | A | 12/2000 | Yaklin | |
| 6,175,218 | B1 * | 1/2001 | Choi et al. | 323/222 |
| 6,219,262 | B1 | 4/2001 | Burgyan | |
| 6,359,426 | B1 | 3/2002 | Sarles et al. | |
| 6,456,157 | B1 | 9/2002 | Forbes et al. | |
| 6,552,919 | B1 * | 4/2003 | Bors | 363/42 |
| 6,674,672 | B2 | 1/2004 | Forbes et al. | |
| 6,822,426 | B1 * | 11/2004 | Todd et al. | 323/275 |
| 7,017,060 | B2 | 3/2006 | Therien et al. | |
| 7,026,798 | B2 * | 4/2006 | Cheung et al. | 323/225 |
| 7,088,141 | B2 | 8/2006 | Deogun et al. | |
| 7,099,164 | B2 | 8/2006 | Zhu et al. | |

(Continued)

FOREIGN PATENT DOCUMENTS

JP 10126235 A * 5/1998

*Primary Examiner*—Akm E Ullah
*Assistant Examiner*—M'Baye Diao
(74) *Attorney, Agent, or Firm*—Meyertons Hood Kivlin Kowert & Goetzel, P.C.; Jeffrey C. Hood

(57) ABSTRACT

Transient processing mechanisms for power converters. Error generation circuitry in a power converter may generate an error signal based on the difference between a power converter output voltage and a reference voltage. Transient detection circuitry may detect whether the error signal exceeds at least a first threshold. If the first threshold is exceeded, timing control logic may generate a low band correction pulse to adjust the power converter output voltage, and thereby adjust the error signal to a level within the first threshold. If the error signal exceeds a second threshold, the timing control logic may generate a high band correction pulse to adjust the power converter output voltage, and thereby adjust the error signal to a level within the second threshold. The timing control logic may initiate a low band blanking period following the low band correction pulse and high band blanking period following the high band correction pulse.

20 Claims, 11 Drawing Sheets

U.S. PATENT DOCUMENTS

| | | |
|---|---|---|
| 7,149,098 B1 | 12/2006 | Chen |
| 7,180,274 B2 * | 2/2007 | Chen et al. ................. 323/222 |
| 7,340,224 B2 * | 3/2008 | Marsili ................... 455/114.1 |
| 2002/0024378 A1 | 2/2002 | Forbes et al. |
| 2003/0223253 A1 * | 12/2003 | Chen et al. ..................... 363/65 |
| 2004/0263139 A1 * | 12/2004 | Goto et al. .................. 323/282 |
| 2006/0043955 A1 * | 3/2006 | Hung ......................... 323/283 |
| 2006/0291258 A1 | 12/2006 | Zhu et al. |

* cited by examiner

TRANSIENT PROCESSING MECHANISM FOR POWER CONVERTERS

PRIORITY CLAIM

This application claims benefit of priority of U.S. provisional application Ser. No. 60/723,282 titled "System and Method for Implementing Distributed Power Management", filed Oct. 3, 2005.

BACKGROUND OF THE INVENTION

1. Field of the Invention

This invention relates to power converters and, more particularly, to transient recovery mechanisms in power converters.

2. Description of the Related Art

From 1995 to 2001, the highest density processors from manufacturers such as Intel went from a power consumption rate of about 30 Watts at 3.3 V to a power consumption rate of about 90 Watts delivered at 1.5 V. A simple application of the power-voltage-current relationship reveals that the total current consumed by these chips has increased from nine amps to about 60 amps in a very short time period. There are similar analogies with all larger digital integrated circuits (ICs).

This rapid evolution has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Traditionally, DC power supplies were designed to convert AC line voltage to one or more DC outputs that would be routed throughout a system to the points of load (POL). FIG. 1 is an illustration of a prior art power distribution system. As shown in FIG. 1, a power distribution scheme 100 may comprise an AC to DC converter 102 generating output voltages $V_1$, $V_2$, $V_3$, and $V_4$ that may be distributed to various POLs (point of loads). However, it may not be practical to route high-current signals throughout a system.

To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA, and is illustrated in FIG. 2. As shown in PDA system 200 of FIG. 2, an AC to DC voltage converter 202 may produce an intermediate DC voltage $V_x$, which may be routed to individual local DC to DC converters 204, 206, 208, and 210, which in turn may provide the required DC voltages $V_1$, $V_2$, $V_3$, and $V_4$, respectively, to their corresponding POLs. With a DPA, errors may be reduced since the distance traveled by a high-current signal is minimized, thus reducing I×R (resistive) and L di/dt (inductive) errors.

In many power distribution systems it is typically not enough to just distribute power around a system to the various POLs. Complex electronic systems are generally monitored and controlled to ensure maximum reliability and performance. Functions (power supply features) typically implemented in DPA systems are listed below.

Supply Sequencing

A modern electronic system can contain many ICs and each IC can have several supply voltage requirements. For example, core logic may require one voltage and the I/O may require a different voltage. This typically results in a need for setting the order in which the voltages on a single chip are applied and the order in which the chips in a system are powered up.

Hot Swap

Many electronic systems, including computers, telecom racks, storage devices and battery-operated devices require "hot swap" capability. Hot swap capability typically comprises the live attachment of a device to power, i.e., attaching a device to a system that is powered up (without having to power down the system prior to the attachment). Examples of hot swap events may include installing a battery in a PDA or plugging a USB device into a computer.

Ramp Control

It is sometimes necessary to control the rate at which the DC output voltage of a converter ramps from its initial value to its nominal value. This may be done in support of managing a hot-swap event, sequencing requirement or satisfying the requirements of the load.

Voltage Programming

The final voltage presented to a load may need to be programmed to the desired value or may need to be "trimmed" to a precise value. Some systems require active voltage programming of devices during their use.

Load Monitoring

In order to maintain high reliability of an electronic system, monitoring of load status is sometimes required. Both current and voltage may need to be monitored and action may need to be taken based on the load status measurements. Current and voltage may also need to be monitored for undershoot and overshoot conditions. In some systems, when an error is detected, the system may take corrective action by switching the load off, isolating the load or just setting a system flag.

Tracking

Many times it is desirable to have the output of one or more converters follow, or mirror, the output of one or more other converters in the system. Tracking a specific voltage level, for example, may include setting the voltage level of a tracking converter or device to the voltage level of a tracked converter or device, and changing the voltage level of the tracking device to match the voltage level of the tracked device any time the voltage level of the tracked device changes. In some cases the voltage levels of tracking devices and tracked devices may not be the same; changes in the tracked voltage level would simply be mirrored in the voltage output of the tracking devices. For example, if the tracked voltage increases by 0.2V, the tracking voltage would also increase by 0.2V.

Temperature Monitoring

Dense electronic systems often generate excessive waste heat. The excessive heat generally needs to be removed in order to keep the electronics operating at their safe operating temperature. Therefore, the temperature of individual loads as well as the temperature of various locations within the system's enclosure is typically monitored. When temperatures reach unacceptable limits, action may need to be taken locally and/or at the system level. Such corrective actions often include turning on or speeding up fans, setting an alarm or simply shutting down the power to the problematic load. Temperatures can be measured using several methods. Some large digital processors sometimes incorporate embedded temperature sensor diodes on chip. Other systems may employ thermistors and IC temperature sensors.

Fan Speed Control

In conjunction with temperature monitoring it is often necessary to monitor and control fan speed. This may be done to control air flow or to control acoustic noise.

Phase Control

DC voltage is typically stepped down in one of two ways, linear regulation and DC-to-DC conversion. DC-to-DC converters may step down DC voltage by pulse width modulation (PWM) of an input voltage and passive filtering of the output. The duty cycle of the PWM signal generally approximates the ratio of output voltage to input voltage divided by the efficiency of the converter. For example, for an ideal DC-to-DC converter with a desired output of 1.2V and an input of 12V, the duty cycle would be 10%. In high current applications, it is often desirable to force the various DC-to-DC converters to sample different "phases" of their clock cycle. That is, to prevent DC-to-DC converters in a system from all sampling the first 10% of a clock cycle, one converter may sample the first 10% of the clock cycle and the next converter may sample a different 10% of the clock cycle, and so on. This typically reduces noise and improves transient response. This technique is also used in motor control and is often implemented to control multiple fans in a system. PWM controlled fans with staggered phase typically offer reduced acoustic noise.

Current Sharing

In addition to forcing DC-to-DC converters to sample staggered phases of the switching clock, it is sometimes desirable to force two or more independent converters to each deliver an equal share of the load current. This approach provides improved noise and transient response in high-current applications.

Programmable Switching Frequency

Certain DC-to-DC converters feature programmable switch frequencies. Frequencies may be selected based on several system concerns.

Synchronization of Switching Clocks

It is often desirable to synchronize the switching frequency of DC-to-DC converters in a system to each other or to some other system clock. This is typically performed to reduce the probability of mixing the clock or its harmonics with important system clocks. It is of particular interest in communication applications.

There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement gluelogic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system.

In an effort to tie all or most of these functions together at the system level, one approach has been to implement the functions in control ICs responsible for controlling respective POL converters. Some of the functionality may also be programmed into a microcontroller that may communicate with attached POL converters over an I²C (inter-IC communication) bus to coordinate control of all POL converters in the system. FIG. 3 illustrates an example of an I²C-based system. As shown in FIG. 3, a microcontroller 302 may be coupled to POL converters 320, 322, 324, and 326, with the connections between the devices representing an I²C bus. A configuration as shown in FIG. 3 is typically not suited for active control and is used mainly for status monitoring, where POL converters 320, 322, 324, and 326 may send a status signal back to microcontroller 302, which in turn may send a simple control signal to a respective POL converter based on the status information received from the respective POL converter. In general, microcontroller 302 checks status for one POL converter at a time, which may be viewed as a disadvantage when more interactive, real-time communication is desired in a system.

FIG. 4 illustrates one example of a single function implemented in a DPA system. Typically, a supply controller 350 (providing control for executing the function) and DC-to-DC voltage converters 352, 354, 356, and 358 are connected in a point-to-point configuration as shown. Supply controller 350 is coupled to each DC-to-DC converter over dedicated lines, (typically analog lines are used for implementing most functions), more specifically over lines 372 and 362 to converter 352, lines 374 and 364 to converter 354, lines 376 and 366 to converter 355, and lines 378 and 368 to converter 358. Input supply voltage $V_{IN}$ 360 is coupled to each DC-to-DC converter, and in turn DC-to-DC converter 352 may produce, for a respective POL or POLs, DC output voltage 370, DC-to-DC converter 354 may produce DC output voltage 372, DC-to-DC converter 356 may produce DC output voltage 374, and DC-to-DC converter 358 may produce DC output voltage 376.

Power converters (e.g., DC-to-DC voltage converters 352, 354, 356, and 358, also referred to as POL converters) usually include a mechanism for recovering from transient output voltage deviations. These short-term voltage deviations may be caused by a variety of control loop disturbances, such as target reference voltage changes, input bus voltage steps, and load current transients. Typically, signal processing circuitry in the control loop of the power converter processes these voltage deviations; however, the recovery process implemented by the control loop is relatively slow.

Many other problems and disadvantages of the prior art will become apparent to one skilled in the art after comparing such prior art with the present invention as described herein.

SUMMARY OF THE INVENTION

Various embodiments are disclosed of a transient processing mechanism for power converters. In one embodiment, a power converter may include error generation circuitry, transient detection circuitry, and timing control logic. The error generation circuitry may generate an error signal based on the difference between a power converter output voltage and a reference voltage. The transient detection circuitry may detect whether the error signal exceeds at least a first threshold. If the error signal exceeds the first threshold, the timing control logic may generate at least one correction pulse to adjust the power converter output voltage, and thereby adjust the error signal to a level within the first threshold. The timing control logic may also initiate a blanking period following the at least one correction pulse.

In one embodiment, if the error signal exceeds the first threshold, the timing control logic may generate a low band correction pulse to adjust the power converter output voltage, and thereby adjust the error signal to a level within the first threshold. The timing control logic may also initiate a low band blanking period following the low band correction pulse. If the error signal exceeds a second threshold during the low band blanking period that follows the low band correction pulse, the timing control logic may generate a high band correction pulse to adjust the power converter output voltage, and thereby adjust the error signal to a level within the second threshold. The generation of the high band correction pulse may terminate the low band blanking period. If the error signal exceeds a second threshold during the low band correction pulse, the timing control logic may generate a high band correction pulse following the low band correction pulse. The timing control logic may then initiate a high band blanking period following the high band correction pulse. The timing control circuit may include a correction pulse feedback mechanism to prevent generation of a high band correction pulse when a low band correction pulse is active, and to prevent generation of a low band correction pulse when a high band correction pulse is active.

In one embodiment, the transient detection circuitry may include a plurality of comparators to receive the error signal from the error generation circuitry and detect whether the error signal exceeds a plurality of thresholds. A first subset of a plurality of comparators may compare the error signal to a low band threshold. The low band threshold comparators may include a built-in analog hysteresis of a predetermined amount to implement a delayed turn-off threshold. The transient detection circuitry may further include hysteresis logic circuitry connected to a second subset of the plurality of comparators. The hysteresis logic circuitry may add a hysteresis-like function that implements a delayed turn-off threshold for each output of the second subset of the plurality of comparators. The hysteresis logic circuitry may also be connected to each output of the first subset of the plurality of comparators, such that each of the delayed turn-off thresholds associated with the outputs of the second subset of the plurality of comparators is dependent upon the turn-off threshold of a corresponding comparator of the first subset of the plurality of comparators.

In one embodiment, the power converter also includes a pulse width modulator (PWM) configured to generate at least one PWM output pulse. The PWM output pulse may be combined with one or more correction pulses to adjust the power converter output voltage, and thereby adjust the error signal to a level within the first threshold. The timing control logic may include a hold mechanism to detect the state of the PWM output pulse and delay completion of the at least one correction pulse to prevent overlapping the at least one correction pulse and the PWM output pulse.

Figure 1:
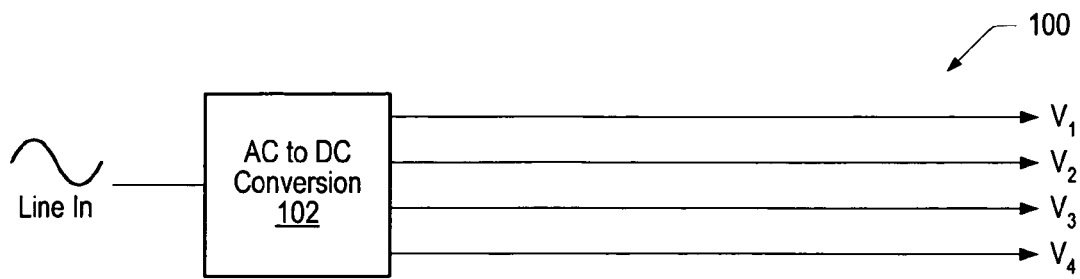
FIG. 1 is a prior art power distribution circuit.
Figure 2:
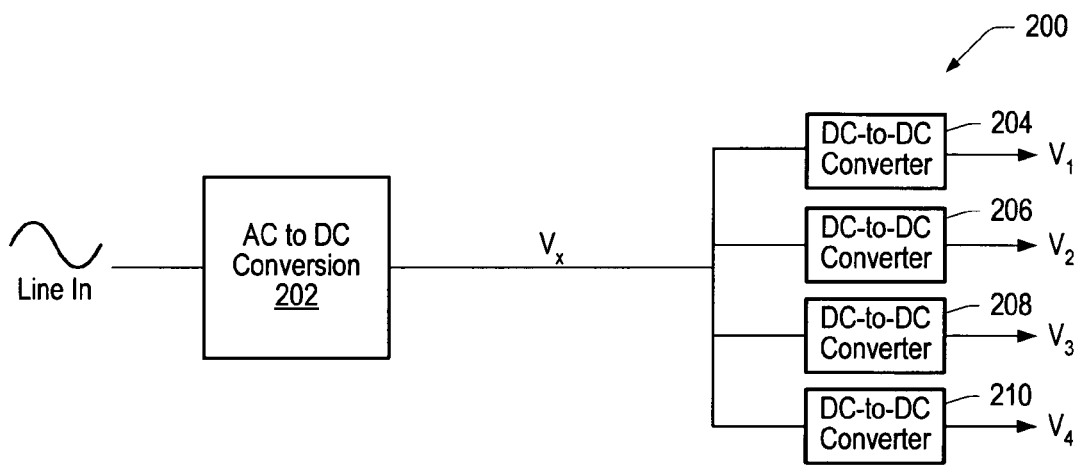
FIG. 2 is a prior art distributed power architecture (DPA)
Figure 3:
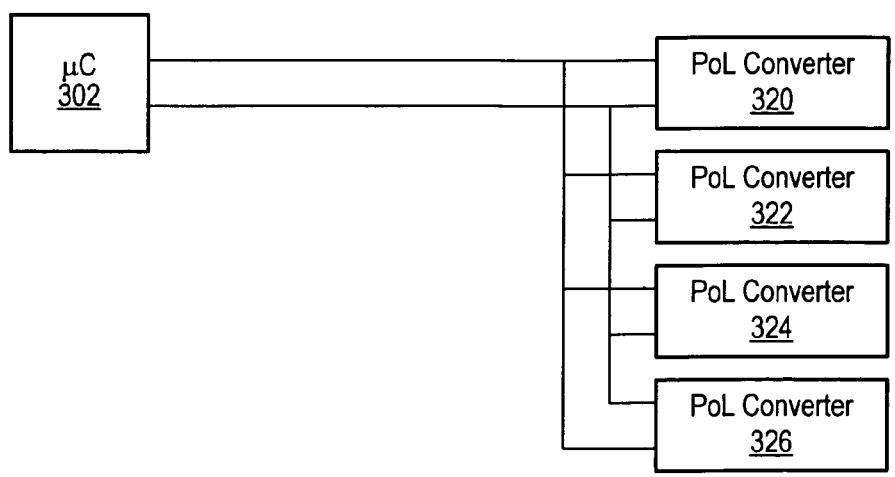
FIG. 3 is a prior art system wherein a microcontroller communicates with POL converter devices over an I²C bus.
Figure 4:
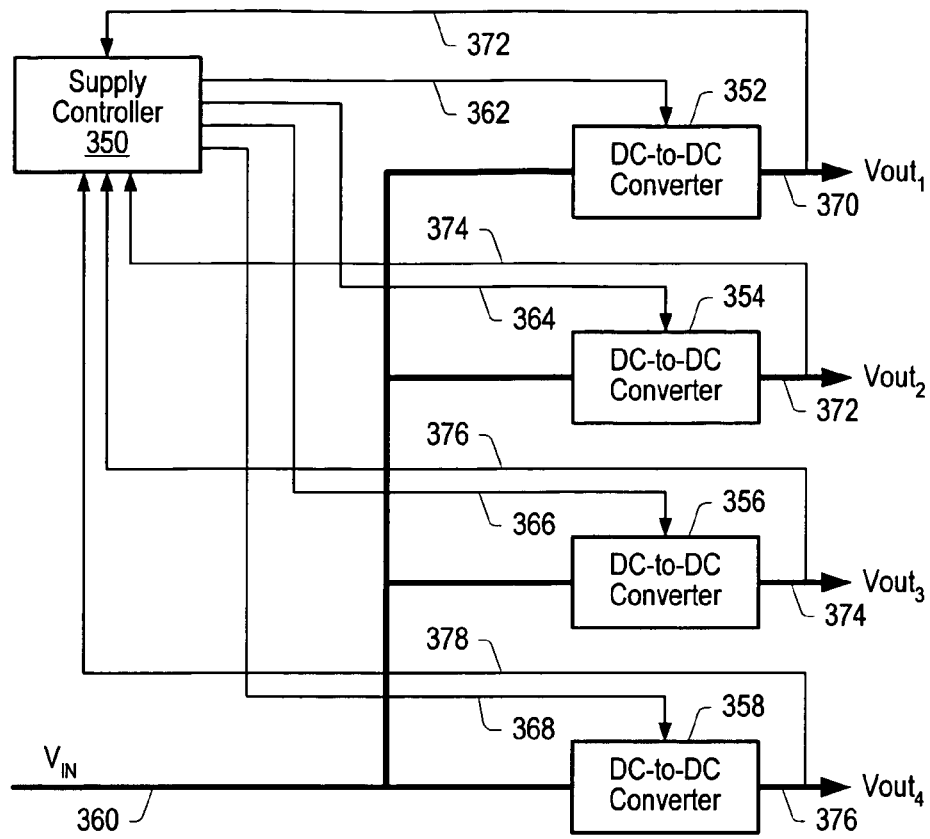
FIG. 4 is a prior art system wherein DC-to-DC voltage converters are interconnected in a point-to-point configuration, controlled by a central supply controller to perform a specific function.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

The following references are hereby incorporated by reference in their entirety as though fully and completely set forth herein:

U.S. Patent Application Publication No. 2004/0201279 (Ser. No. 10/820,976), titled "Method And Apparatus For Improved DC Power Delivery, Management And Configuration," filed Jun. 21, 2004.

U.S. patent application Ser. No. 11/198,698, titled "Method For Using a Multi-Master Multi-Slave Bus For Power Management," filed Aug. 5, 2005.

Figure 5:
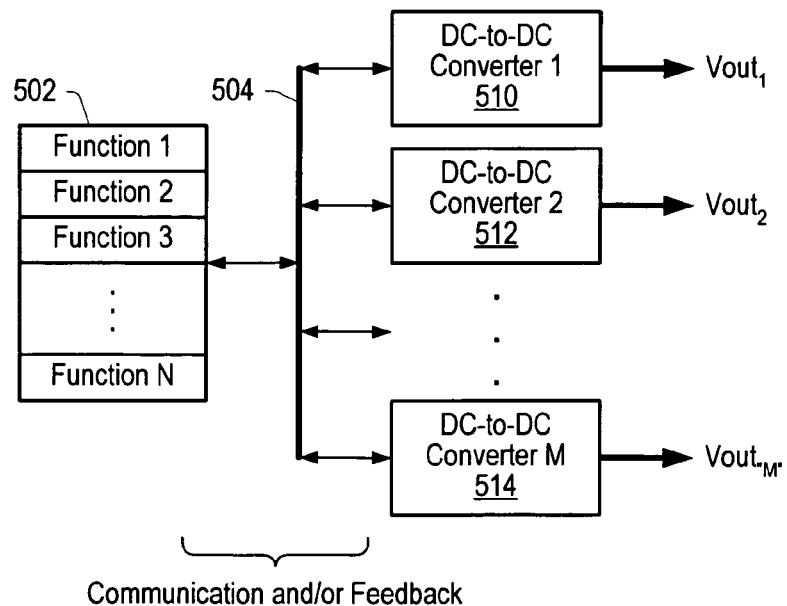
FIG. 5 is a block diagram of one embodiment of a system for improving DC power delivery, management, and configuration.

FIG. 5 is a block diagram of one embodiment of a power distribution system. As shown, the common functions required in a complex DC power system may be combined in a single controller rather than treated as separate IC functions. As illustrated in the embodiment of FIG. 5, a controller 502 managing functions 1 through N may be coupled to DC-to-DC converters 1 through M (illustrated by example as power converters 510, 512 and 514) via a digital bus 504. Digital bus 504 may be a serial bus enabling communication with reduced wiring requirements. In the configuration shown in FIG. 5, real-time communication is made possible between power converters 510, 512, and 514 and controller 502 by their being coupled to serial digital bus 504. It is noted, however, that in other embodiments the power converters may communicate with the controller 502 and with each other by other means, e.g., a parallel bus.

Figure 6:
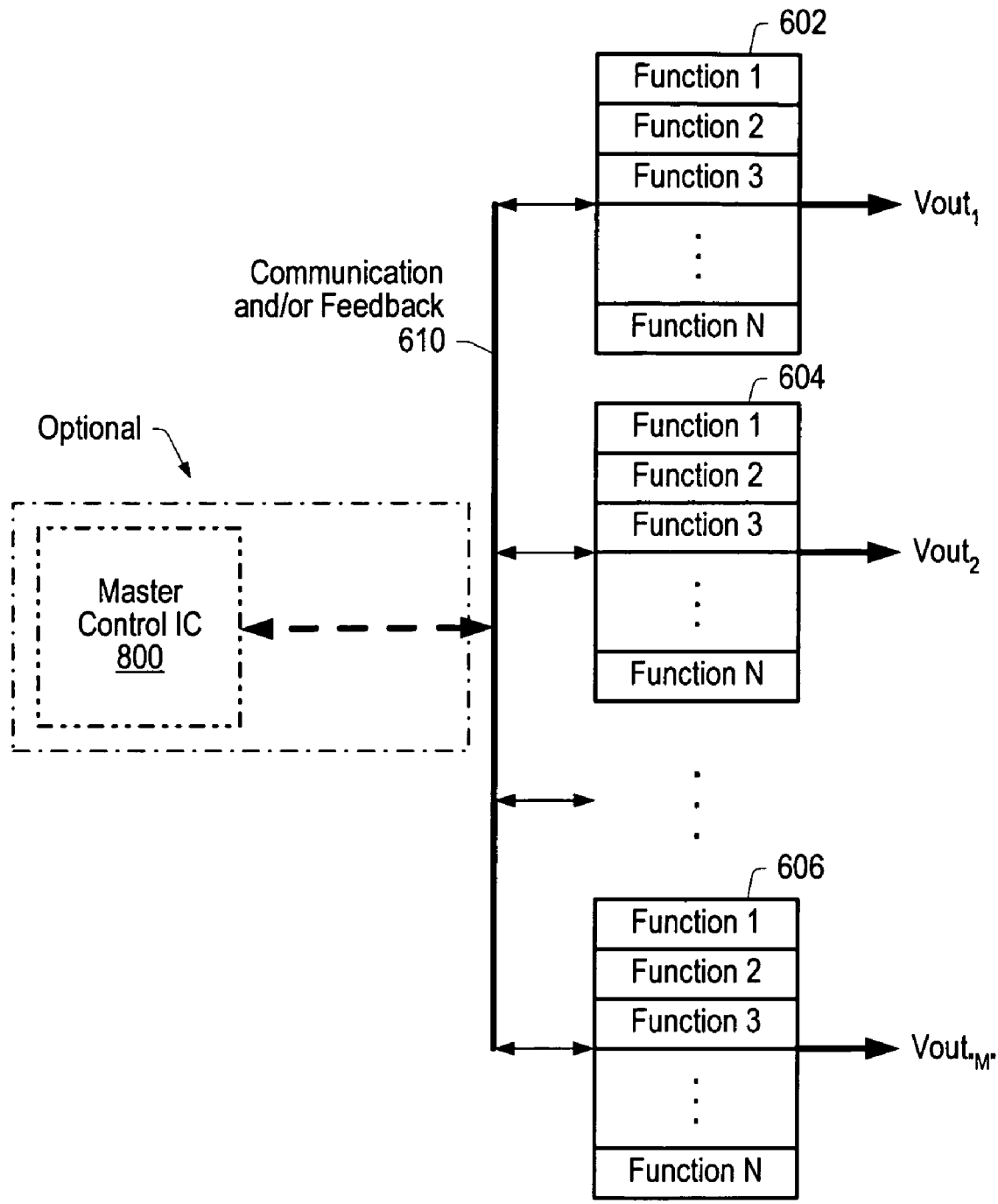
FIG. 6 is a block diagram of one embodiment of a system including digital power management devices (DPMDs)

The illustrated embodiment of FIG. 6 provides a system-oriented solution using mixed-signal IC technology, allocating one unit of each function to a single point of load (POL) IC, or digital power management device (DPMD). In this embodiment, one DC-to-DC voltage converter, one unit of supply sequencing, one unit of load monitoring, and one respective unit of various other functions (previously discussed) are combined in each DPMD, e.g., in each of DPMD 602, DPMD 604, and DPMD 606.

As illustrated in the embodiment of FIG. 6, DPMDs 602, 604, and 606 have each been allocated Functions 1 through N, and are coupled together via serial digital bus 610. Bus 610 may be simpler than an I²C bus and may offer more control and signaling, including real-time data feedback capability. Bus 610 may also allow each DPMD to be coupled to a master control IC (MCIC) 800, or to be coupled only to each other, enabling all system level functions to be configured, controlled and monitored providing simple and flexible results. MCIC 800 is shown mostly for illustrative purposes, and preferred embodiments may omit MCIC 800 and only include DPMDs coupled to bus 610, where all required functions may be controlled by a single DPMD or a group of DPMDs operating together. By configuring each POL device or DPMD to have the ability to communicate with any other POL device or DPMD coupled to bus 610, each POL device or DPMD may act as either a master or a slave on bus 610, thereby obviating the need for MCIC 800 where it may be desirable to design a power delivery system without MCIC 800, or without any other similar central control unit.

Various embodiments, as illustrated in FIG. 6, provide a modular approach to designing DPA systems, providing system level functionality without requiring the system to be individually and separately configured for each desired function that may be required. Each DPMD may be individually configured prior to its being placed in the system, and may operate to perform all necessary functions by having access to real-time feedback information over bus 610, and by communicating with other DPMDs. This represents active control as opposed to simple status monitoring. Several devices may be enabled when the DPA system is configured as illustrated in the embodiment FIG. 6. Rather than just having a DC-to-DC converter, a DPMD may comprise a DC-to-DC converter, and any or all of the associated control, configuration and monitoring functions associated with a single node. Furthermore, in some embodiments, each DPMD of FIG. 6 and/or each power converter of FIG. 5 may include an improved mechanism for transient processing, as will be further described below with reference to FIGS. 7-13.

Figure 7:
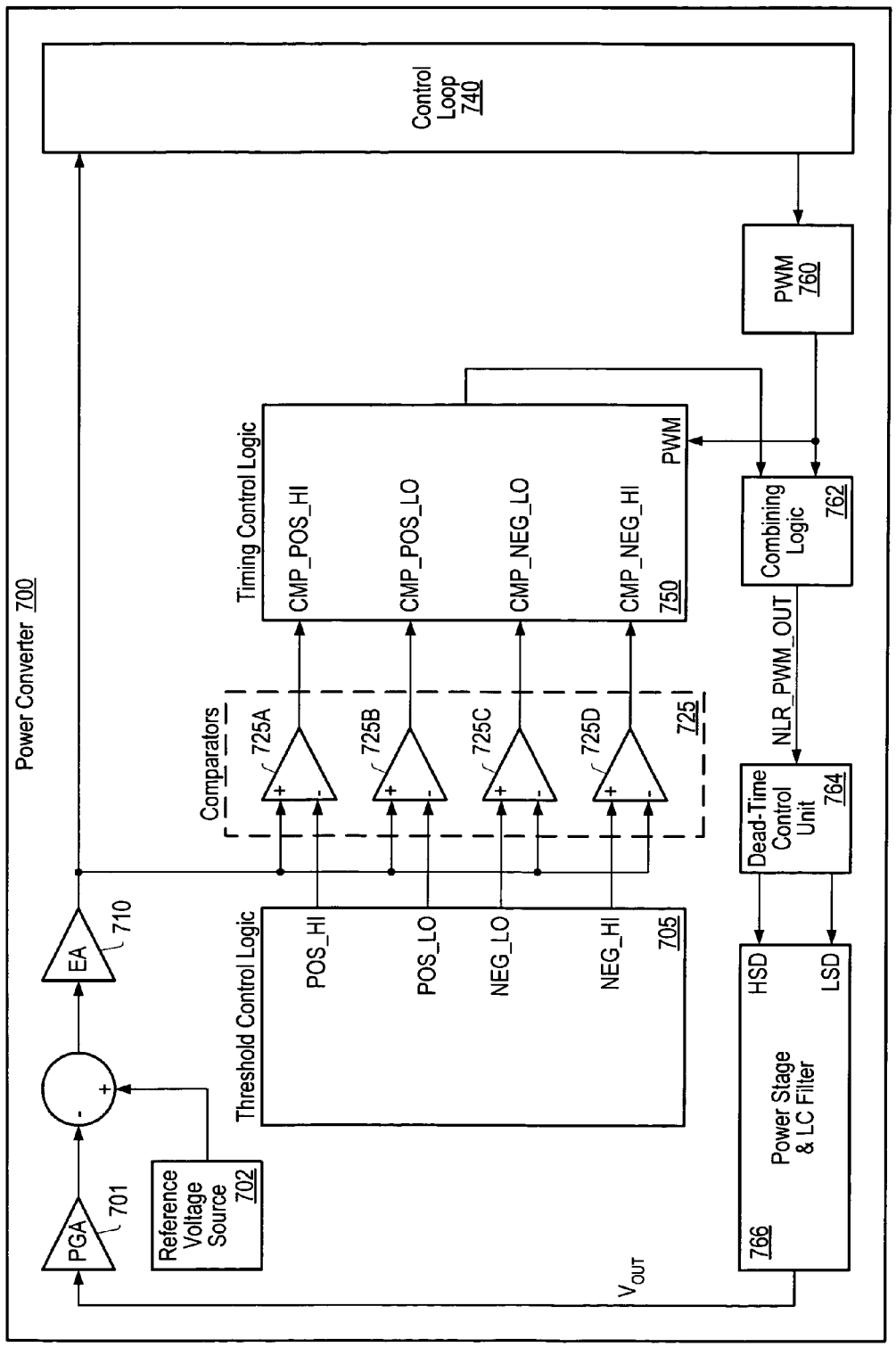
FIG. 7 is a block diagram of one embodiment of a power converter including an improved mechanism for transient processing.

FIG. 7 is a block diagram of one embodiment of a power converter 700 including an improved mechanism for transient processing. In one specific implementation, power converter is formed as shown in the embodiment of FIG. 7. In this embodiment, power converter 700 may offer an improved transient recovery mechanism over typical digitally controlled switching power converters, which employ a duty cycle calculation algorithm based on discrete-time linear difference equations. The usually slow response of the duty cycle calculator to short-term transient error conditions may be substantially improved with a nonlinear transient side-chain processor that is activated during error conditions. It is noted that in various embodiments power converter 700 may be configured as a DC-to-DC converter, a digital power management device (DPMD), an AC-to-DC converter, among others, and may be included in numerous types of power distribution systems, e.g., in one or more of the systems illustrated in FIGS. 1-6.

The transient side-chain processor may include transient threshold control logic 705, fast analog comparators 725 (725A-725D), and transient timing control logic 750. As depicted in the embodiment of FIG. 7, in addition to the transient side-chain processor, power converter 700 may include a programmable gain amplifier (PGA) 701, a reference voltage source 702, an error amplifier 710, a control loop 740, a pulse width modulator (PWM) 760, transient/PWM combining logic 762, a dead-time control unit 764, and a power stage/LC filter 766. It should be noted that the components described with reference to FIG. 7 are meant to be exemplary only, and are not intended to limit the invention to any specific set of components or configurations. For example, in various embodiments, one or more of the components described may be omitted, combined, modified, or additional components included, as desired.

During operation, error amplifier 710 may generate an error signal based on the difference between the power converter output voltage and a reference voltage. It is noted that the power converter output voltage may be the output signal (Vout) from power converter, or a scaled version thereof. The reference voltage may be provided by reference voltage source 702. Reference voltage source 702 may be a target digital-to-analog converter (DAC) that generates the desired reference voltage. Error amplifier 710 provides the error signal to both control loop 740 and the transient side-chain processor. For example, in one embodiment, error amplifier 710 may provide the error signal to an error analog-to-digital converter (ADC) of the control loop 740 and to comparators 725 of the side-chain processor. It is noted, however, that in other embodiments other types of error generation circuitry may detect the difference between the power converter output voltage and the reference voltage and generate the error signal.

When the transient side-chain processor receives the error signal, the high-speed analog comparators 725 are used to detect when the error signal from error amplifier 710 has exceeded a pre-defined tolerance band, thus enabling the transient side-chain logic to bring the power converter output voltage quickly back to a regulation point. The tolerance band is defined by two or more thresholds (e.g., POS_HI, POS_LO, NEG_HI, and NEG_LO), which are provided to the comparators 725 by the transient threshold control logic 705. The thresholds may be programmable to vary the levels when the comparators 725 detect an error condition. In one embodiment, the transient side-chain logic may operate from a high frequency internal clock, e.g., 64 times the PWM switching frequency (Fsw), which may be derived from the main system PLL for the overall power converter control loop. It is noted, however, that in other embodiments the transient side-chain logic may operate at other speeds to perform the transient function.

When the error signal crosses any of the thresholds, transient timing control logic 750 of the side-chain processor may be triggered by the error condition and may generate one or more correction pulses, which adjust an inductor current, up or down, such that the power converter output voltage is brought rapidly back towards the regulation point. In some embodiments, four discrete analog detection thresholds may be used for transient event triggering, each threshold corresponding to one of the comparators 725. In the illustrated embodiment of FIG. 7, these thresholds are termed POS_LO for positive low band, NEG_LO for negative low band, POS_HI for positive high band, and NEG_HI for negative high band. In one embodiment, when control loop 740 includes an error ADC connected to the output of error amplifier 710, the high band thresholds may be placed further away from the zero error set-point of the error ADC than the low band thresholds. Also, in various embodiments, the thresholds may be spaced apart by an integer multiplier (typically 2, 3, 4, or 5), such that the individual high band thresholds track a corresponding low band threshold, as will be further described below.

The four pulses generated by the timing control logic 750 may be used to signify whether a small or large and either positive or negative output correction is needed to recover from the error condition. The four pulses may be summed in with the output of PWM 760 by transient/PWM combining logic 762. Then, dead-time adjustments, i.e., non-overlap control for the power stage MOSFET switches, may be added by the dead-time control unit 764. Depending on the type of error condition detected, either the high-side MOSFET or the low-side MOSFET in the power stage 766 may be turned on to generate a correction current. The correction current may adjust the inductor current up or down to bring the power converter output voltage back to a level within the regulation point. It is noted, however, that in other embodiments other mechanisms in the power converter 700 may use the correction pulses generated by the side-chain processor to bring the power converter output voltage back to a level within the regulation to terminate the error condition.

Figure 8:
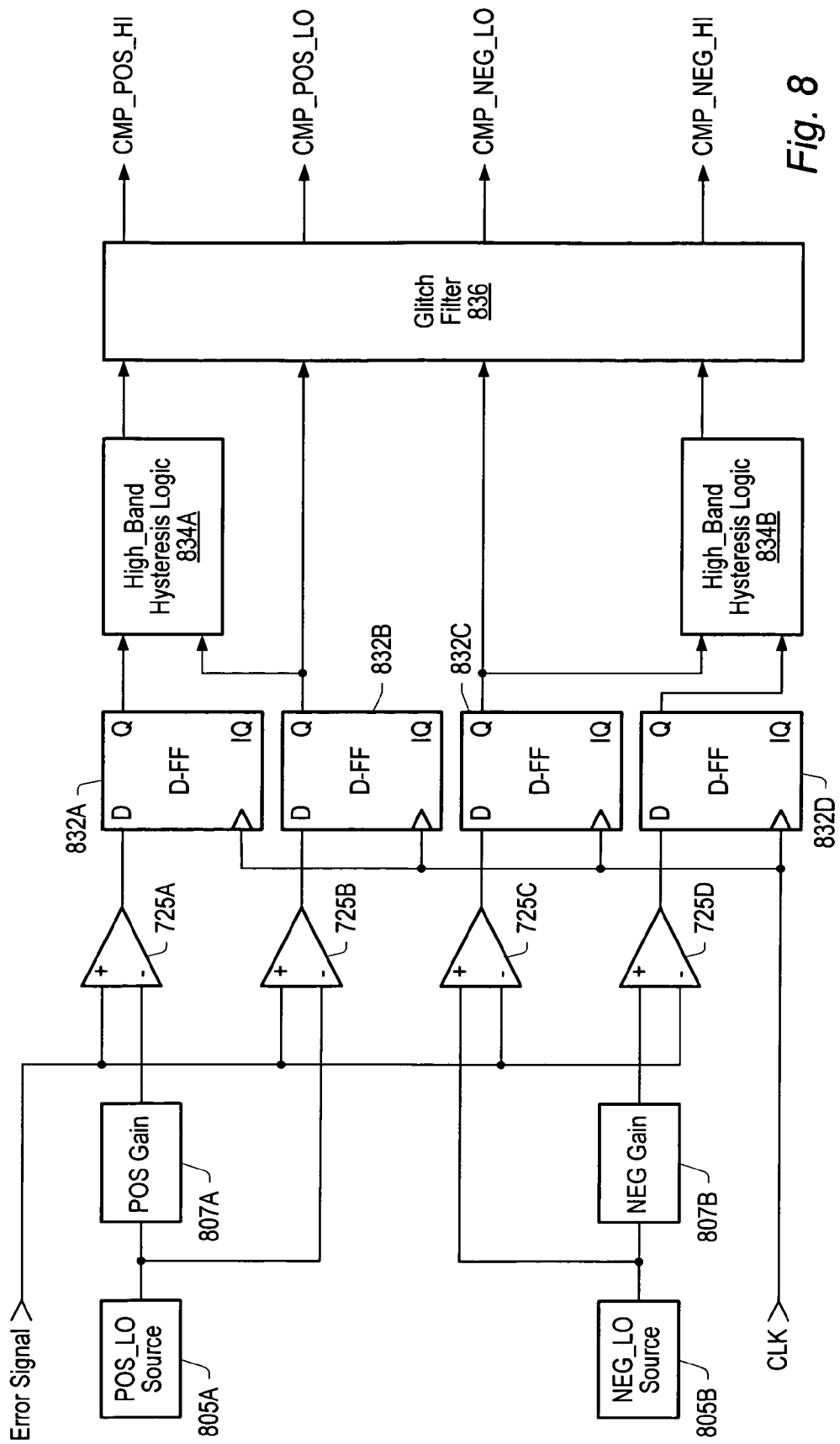
FIG. 8 is a diagram of one embodiment of transient detection portion of the transient side-chain processor.

FIG. 8 is a diagram of one embodiment of transient detection portion of the transient side-chain processor. The transient detection circuitry may include a POS_LO source 805A, a NEG_LO source 805B, POS gain logic 807A, NEG gain logic 807B, comparators 725, D flip-flops 832 (832A-832D), and high band hysteresis logic 834A and B. POS_LO source 805A and NEG_LO source 805B may generate the positive low band and the negative low band thresholds, respectively. In one embodiment, each of the POS_LO and NEG_LO sources is a DAC that generates the desired threshold in response to receiving a predetermined step size. The POS gain logic 807A may receive the positive low band threshold and generate the positive high band threshold, and the NEG gain logic 807B may receive the negative low band threshold and generate the negative high band threshold, such that the high band thresholds are a predetermined ratio of their low band counterpart. In one embodiment, the threshold value corresponding to each of the POS_LO source 805A and NEG_LO source 805B and the gain corresponding to each of the POS gain logic 807A and NEG gain logic 807B is programmable. It is noted, however, that in other embodiments the thresholds may be generated by other methods, e.g., four separate and independently programmable sources providing the threshold values directly to the comparators 725.

The transient detection portion of the transient side-chain processor may include four comparators 725A-725D, each receiving the error signal from the error amplifier and determining whether the error signal exceeds at least one of the corresponding thresholds. For example, comparator 725A may compare the error signal to the POS_HI threshold, comparator 725B may compare the error signal to the POS_LO threshold, comparator 725C may compare the error signal to the NEG_HI threshold, and comparator 725D may compare the error signal to the NEG_LO threshold. The low band comparators 725B and 725C may generate the low band thresholds, and the high band comparators 725A and 725D may generate the high band thresholds. Each of the comparators 725 provides an indication signal (CMP_POS_HI, CMP_ POS_LO, CMP_NEG_HI, CMP_NEG_LO) to the transient timing control logic 750 indicating whether or not the corresponding threshold was exceeded. In one embodiment, the indication signals may be synchronized to a clock using the D flip-flops 832. It is noted, however, that in various embodiments the transient detection circuitry may include additional comparator stages, e.g., six or more comparator stages.

In one embodiment, the low band comparators may have built-in analog hysteresis of a predetermined amount to implement a delayed turn-off threshold. In other words, the analog hysteresis may delay when the CMP_POS_LO and the CMP_NEG_LO indication signals are disabled. The high band hysteresis logic 834A and 834B may be included to digitally add a hysteresis-like function that implements a delayed turn-off threshold for each of the high band comparator outputs (CMP_POS_HI and CMP_NEG_HI).

Figure 9:
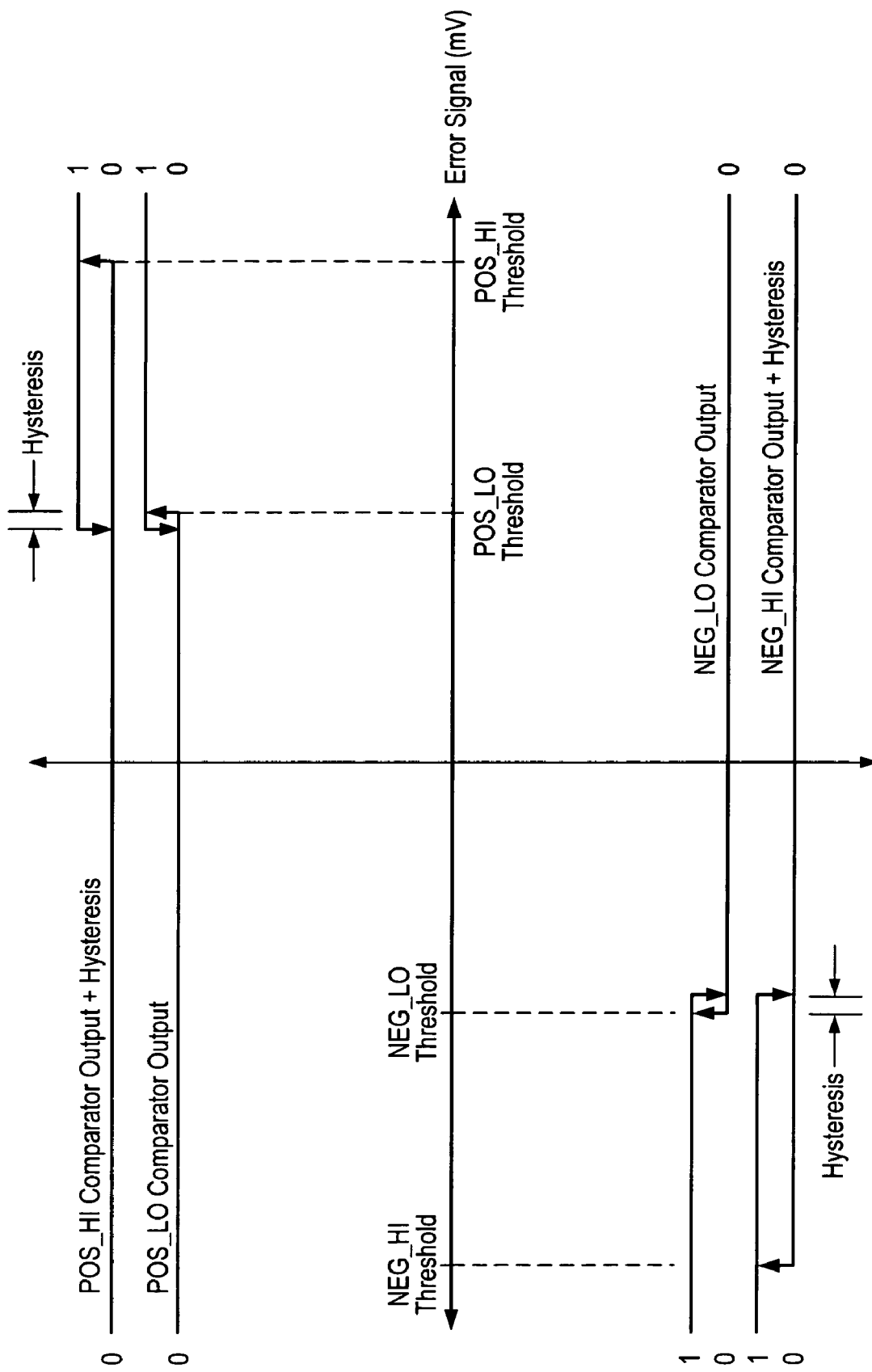
FIG. 9 illustrates delayed turn-off thresholds including a predetermined amount of hysteresis, according to one embodiment.

FIG. 9 illustrates the delayed turn-off thresholds including the corresponding amount of hysteresis, according to one embodiment. It is noted that the turn-off thresholds are represented by a down arrow and the turn-on thresholds are represented by an up arrow. In such an arrangement, hysteresis logic 834 may cause a high band comparator output to remain active even after falling below the turn-on threshold until the error signal crosses back through a corresponding low band turn-off threshold. In other words, hysteresis logic 834 may monitor the outputs of the low band comparators, such that each of the delayed turn-off thresholds associated with the outputs of the high band comparators is dependent upon the delayed turn-off threshold of a corresponding low band comparator. For example, as depicted in the embodiment of FIG. 9, the delayed turn-off threshold of the POS_HI comparator may be the same as the delayed turn-off threshold of the POS_LO comparator. In this embodiment, when a pair of low and high band pulses are issued in succession, they may continue to be issued as a pair until the error signal crosses through the corresponding low band turn-off threshold. It is noted, however, that in other embodiments hysteresis may be added by other mechanisms, for example, both the low band and the high band comparators may include built-in analog hysteresis. In one embodiment, the analog hysteresis is programmable. It is further noted that in some embodiments the hysteresis may add a delay in the turn-off and/or turn-on thresholds.

As illustrated in the embodiment of FIG. 8, the transient detection circuitry may further include glitch filter 836, which may suppress the effects of spurious comparator tripping due to noise or power stage spikes that may propagate through the analog front end. The glitch filter 836 may prevent unpredictable and false triggers which could inadvertently cause an inductor current step correction when none, in fact, was actually required. This type of erroneous behavior may lead to unstable PID loop response.

The glitch filter 836 may include four up/down counters with a unipolar binary output, and saturation limiting logic at a zero count and a maximum count of $2^{(N-1)}$ (where N is the bit width of the counter, e.g., 3-5 bits). The counters may be clocked at the same rate as the rest of the logic, e.g., 64 times the Fsw. The up/down counters may act as short impulse response 1-bit digital filters, and are coupled with a digital threshold detector to generate the output data signals that are then fed to the timing control logic 750.

The digital threshold detector may enable an output data signal when a "turn_on" threshold is reached. In one embodiment, the turn_on threshold is reached by sensing a long enough series of consecutive "1" periods from one of the comparators 725. Likewise, the output data signal may be disabled when a "turn_off" threshold is reached. In one embodiment, the turn_off threshold is reached by sensing a long enough series of consecutive "0" periods from one of the comparators 725. Essentially, they add a form of digital hysteresis to the trigger signals, based on the accumulated count of "1" or "0" data from the comparators 725. Any short bursts of spurious I/O data transitions from comparators 725, which are insufficient to cause the threshold detector to change its output state from a 0 to 1, or, a 1 to 0, may be rejected by glitch filter 836. Thus, glitch filter 836 may prevent erroneous triggers from being passed on to timing control logic 750. In one embodiment, the digital thresholds associated with glitch filter 836 are programmable, so they may be tuned to the specific noise signature and glitch repetition rate of the system being implemented. It is noted, however, that in some embodiments the design of glitch filter 836 may vary.

As depicted in the embodiment of FIG. 7, timing control logic 750 is connected to the transient detection circuitry for receiving the indication signals CMP_POS_HI, CMP_POS_LO, CMP_NEG_HI, CMP_NEG_LO, which indicate whether the error signal has crossed one of the predetermined thresholds. If the error signal exceeds one of the thresholds, the timing control logic 750 generates at least one pulse to adjust the power converter output voltage, and thereby adjust the error signal to a level within the respective threshold.

Figure 10:
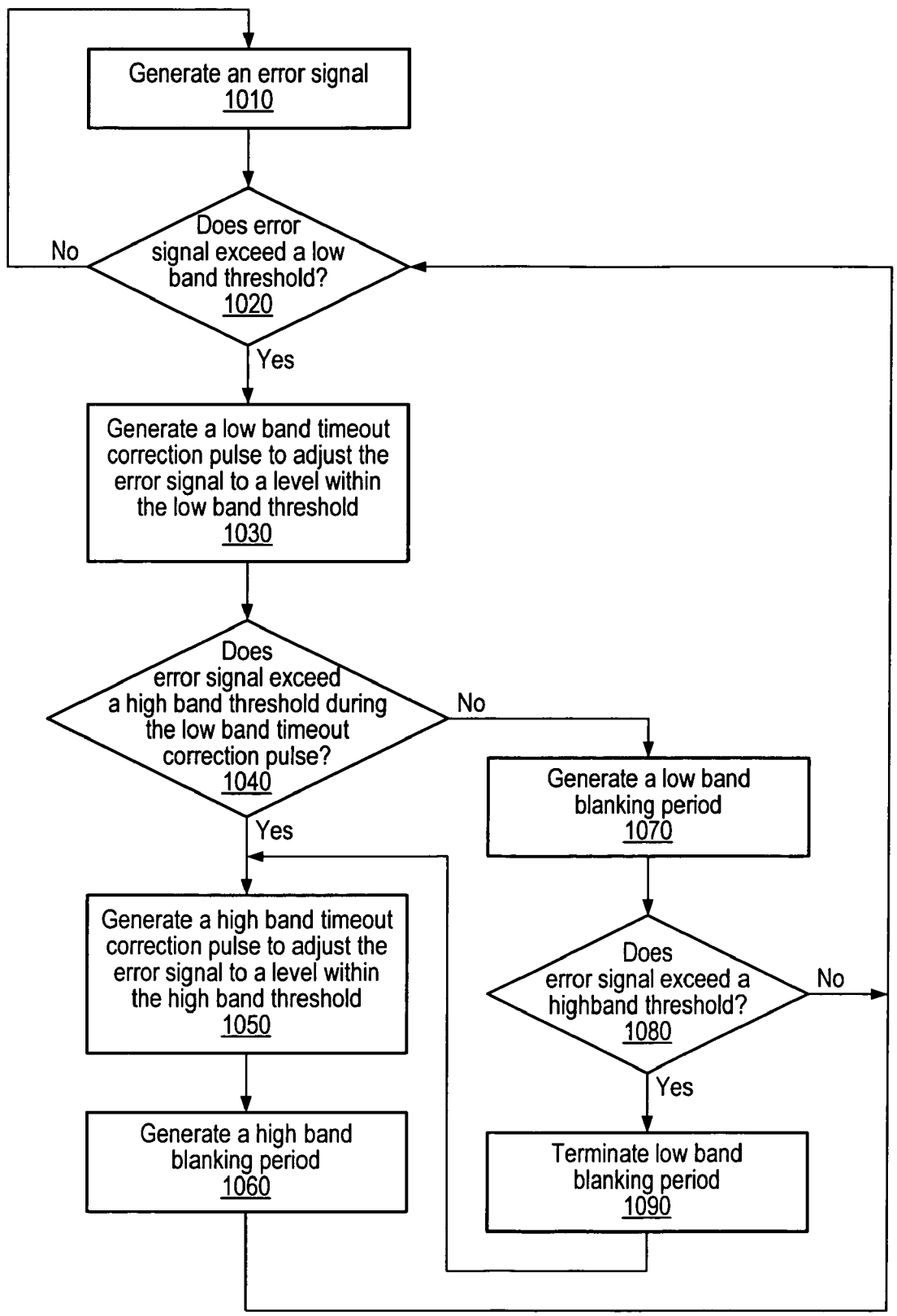
FIG. 10 is a flow diagram illustrating a method for generating correction pulses when the error signal exceeds one of the predetermined thresholds.

FIG. 10 is a flow diagram illustrating a method for generating correction pulses when the error signal exceeds one of the predetermined thresholds. It should be noted that in various embodiments, some of the steps shown may be performed concurrently, in a different order than shown, or omitted. Additional steps may also be performed as desired.

As indicated in block 1010, the error amplifier 710 of the power converter 700 may generate the error signal based on the difference between the power converter output voltage and the reference voltage. If the error signal exceeds a low band threshold (e.g., the POS_LO or NEG_LO threshold), the timing control logic 750 generates a low band timeout correction pulse (e.g., NLR_POS_LO) to adjust the power converter output voltage, and thereby adjust the error signal to a level within the low band threshold, as indicated in blocks 1020 and 1030. As shown in the timing diagram of FIG. 11A, if the error signal does not exceed a high band threshold during the low band timeout correction pulse, the timing control logic 750 may also initiate a low band blanking period (e.g., BLANK_POS_LO) of a predetermined period of time following the low band timeout correction pulse (blocks 1040 and 1070). The low band blanking period may prevent generation of additional low band timeout correction pulses during the predetermined period of time.

Figure 11A:
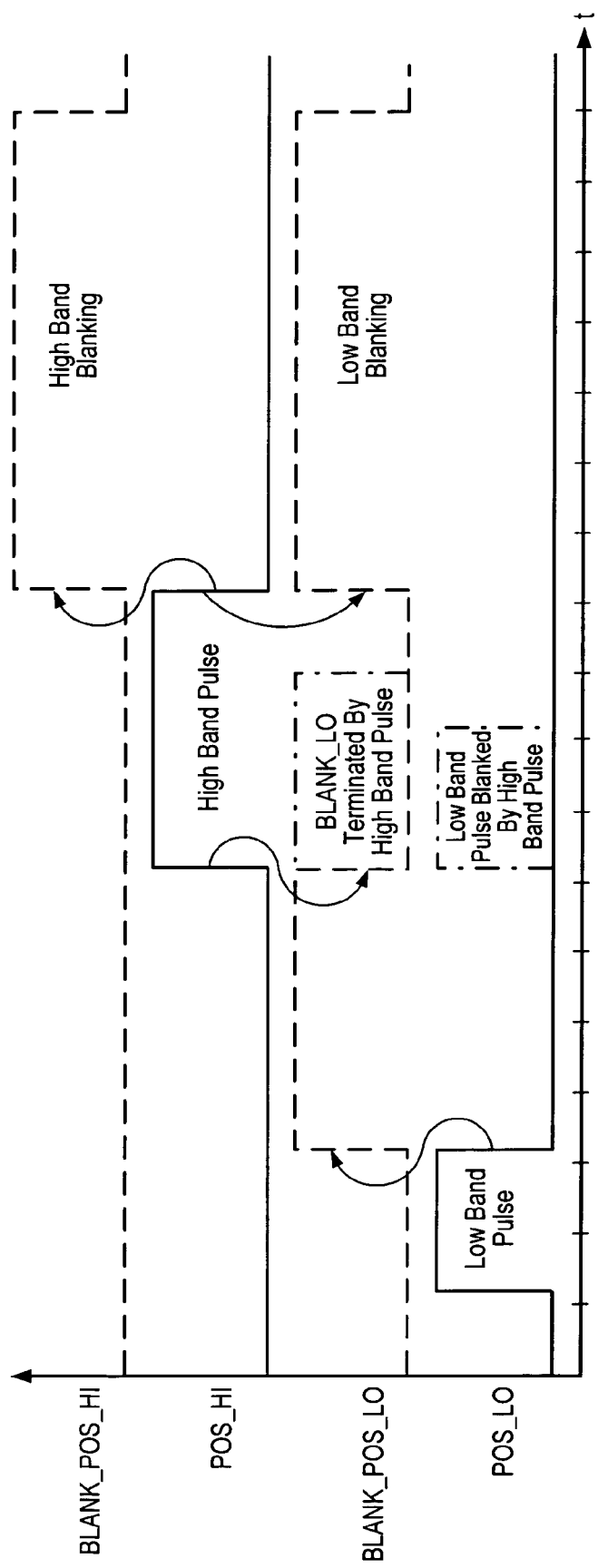
FIGS. 11A and 11B illustrate timing diagrams of low band and high band timeout correction pulses and the corresponding blanking periods, according to one embodiment.

As indicated in blocks 1080 and 1050, if the error signal exceeds a high band threshold (e.g., the POS_HI or NEG_HI threshold) during the low band blanking period that follows the low band timeout correction pulse, timing control logic 750 generates a high band timeout correction pulse (e.g., NLR_POS_HI) to adjust the power converter output voltage, and thereby adjust the error signal to a level within the high band threshold. As illustrated in FIG. 11A, the generation of the high band timeout correction pulse terminates the low band blanking period (block 1090) and blanks generation of a subsequent low band timeout correction pulse. Furthermore, timing control logic 750 initiates a high band blanking period (e.g., BLANK_POS_LO) of a predetermined period of time following the high band timeout correction pulse, as indicated in block 1060. The high band blanking period may prevent generation of additional low band and high band timeout correction pulses during the predetermined period of time, as shown in FIG. 11A.

Figure 11B:
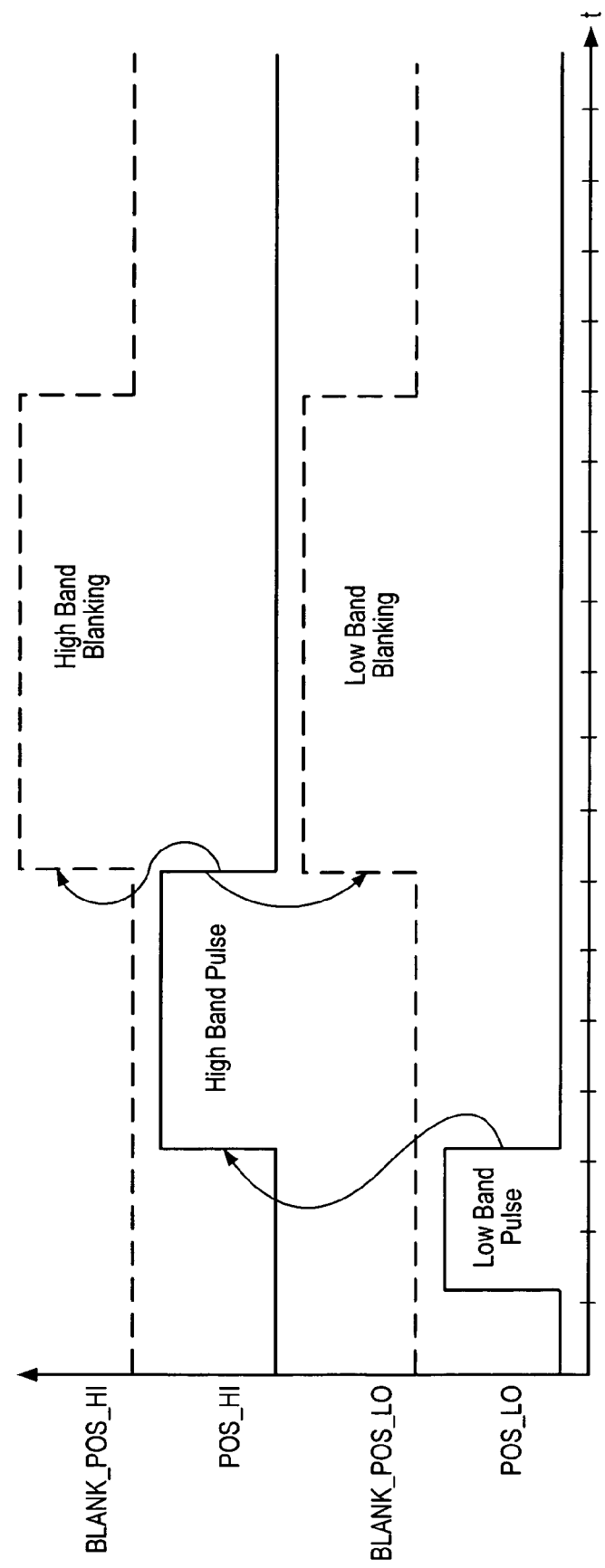

As indicated in blocks 1040 and 1050, if the error signal exceeds the high band threshold during the low band timeout correction pulse, timing control logic 750 generates a high band timeout correction pulse following the low band timeout correction pulse to adjust the power converter output voltage, and thereby adjust the error signal to a level within the high band threshold, as shown in FIG. 11B. It is noted that the high band threshold may be exceeded at any point during the time period corresponding to the low band timeout correction pulse. Timing control logic 750 initiates a high band blanking period of a predetermined period of time following the high band timeout correction pulse (block 1060). The high band blanking period may prevent generation of additional low band and high band timeout correction pulses during the predetermined period of time, as shown in FIG. 11B.

Each of the low band timeout correction pulses may be of a first predetermined pulse width and each of the high band timeout correction pulses may be of a second predetermined pulse width. In one embodiment, timing control logic 750 may terminate an active correction period associated with a low band timeout correction pulse after a time period corresponding to the first predetermined pulse width, and timing control logic 750 may terminate an active correction period associated with a high band timeout correction pulse after a time period associated with the second predetermined pulse width. It is noted that the size of both the low band and high band timeout correction pulses may be programmable. It is further noted that in other embodiments the size of each of the low band timeout correction pulses and/or each of the high band timeout correction pulses may vary in some instances and may be the same in other instances.

In some embodiments, when the error signal returns to a level within the high band threshold, timing control logic 750 may terminate an active correction period associated with the high band timeout correction pulse. Also, when the error signal returns to a level within the low band threshold, timing control logic 750 may terminate an active correction period associated with the low band timeout correction pulse. In these cases, the error signal returning to a level within the threshold may stop the generation of the current pulse, even if it results in a pulse of less than the predetermined width, and may also stop generation of subsequent correction pulses.

Figure 12:
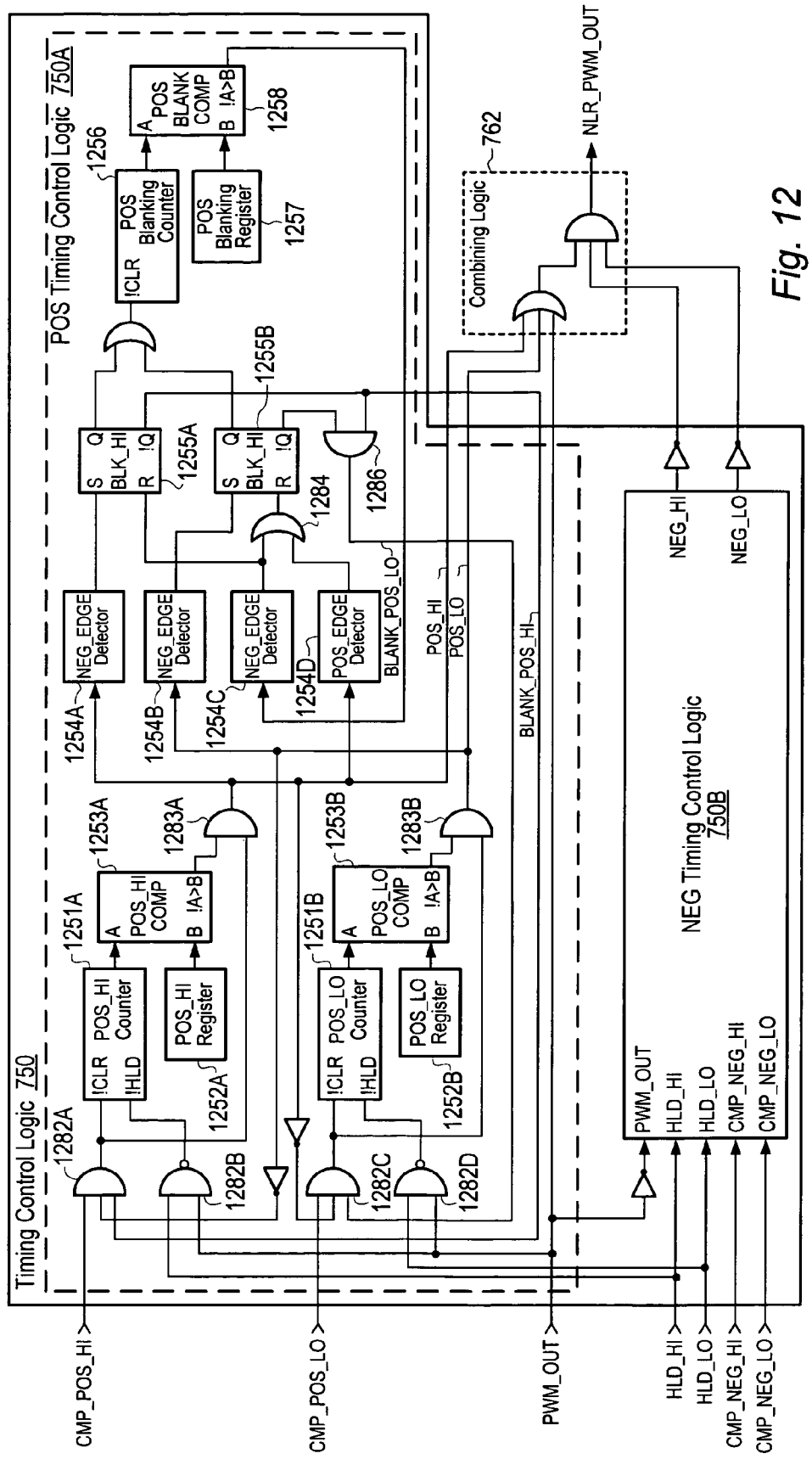
FIG. 12 is a diagram of one embodiment of transient timing control logic.

FIG. 12 is a diagram of one embodiment of timing control logic 750. Timing control logic 750 includes POS timing control logic 750A and NEG timing control logic 750B. The logical connections and operation of the POS timing control logic 750A will be described below. It is noted that in various embodiments the logic connections for the NEG timing control logic 750B are identical to and the circuitry is completely symmetrical in its design and operation as the POS timing control logic 750A.

In one specific implementation, the POS timing control logic 750A is formed as illustrated in the embodiment of FIG. 12. In this embodiment, POS timing control logic 750A includes gating logic 1282-1286, timeout counters 1251, timeout registers 1252, comparators 1253, edge detectors 1254, SR flip-flops 1255, blanking timeout counter 1256, POS blanking register 1257, and POS blanking comparator 1258. It should be noted that the components described with reference to FIG. 12 are meant to be exemplary only, and are not intended to limit the invention to any specific set of components or configurations. For example, in various embodiments, one or more of the components described may be omitted, combined, modified, or additional components included, as desired.

As depicted in the embodiment of FIG. 12, each of POS_HI timeout counter 1251A and POS_LO timeout counter 1251B may have a 3-input AND gate (1282A and 1282C) for driving the !CLR counter control line. The !CLR counter control lines may be used to determine when an timeout correction count begins in timeout counters 1251. The timeout correction count may begin for POS_HI timeout counter 1251A and POS_LO timeout counter 1251B after receiving an enabled CMP_POS_HI and CMP_POS_LO signal, respectively, which may indicate an error condition has been detected by at least one of the comparator 725. The timeout correction count may generate a corresponding timeout correction pulse of a predetermine width by activating the NLR_POS_HI or NLR_POS_LO signals. The magnitude comparators 1253A and 1253B may terminate the active transient correction pulse when the counter output has exceeded the value in the timeout register (e.g., POS_HI timeout register or POS_LO timeout register). In one embodiment, the corresponding active correction pulse may be terminated by forcing a logic "0" into the 2-input AND gates (1283A and 1283B), which are used to generate the NLR_POS_LO and NLR_POS_HI outputs, as shown.

Additional input gating (using the 3-input AND gates 1282A and 1282C) is added to the !CLR inputs on the POS_LO and POS_HI timeout counters 1251A and 1251B, with inverted feedback from NLR_POS_HI and NLR_POS_LO outputs, respectively. This cross-coupled feedback connection may prevent a high band timeout correction pulse from starting until an active low band timeout correction pulse has ended, and vice-versa. This feature may effectively coordinate the generation of the correction pulses, especially when the CMP_POS_HI and CMP_POS_LO indication signals (or their NEG counterparts) are active concurrently. For example, due to this cross-coupled feedback connections, the low and high band timeouts may be effectively concatenated when the high band threshold is crossed before the low band timeout correction pulse is complete. It is noted however that in other embodiments the correction pulse generation function may be implemented by other mechanisms.

Each of POS_HI timeout counter 1251A and POS_LO timeout counter 1251B may also have a 2-input NAND gate (1282B and 1282D) for driving the !HLD counter control line. The !HLD counter control lines may be used to determine if the counting is to be placed on hold by an active PWM_OUT pulse, e.g., generated PWM 760 of FIG. 7. This hold mechanism may detect the state of the PWM output pulse to determine whether to delay the completion of the corresponding timeout correction pulse. The !HLD control inputs of timeout counters 1251A and 1251B are enabled with the HLD_LO and HDL_HI control bits, and a logical "1" PWM pulse for POS timeouts, or logical "0" PWM pulse for NEG timeouts. Using this arrangement, a high PWM pulse holds the POS_LO/POS_HI count, and a low PWM pulse holds the NEG_LO/NEG_HI count.

Figure 13:
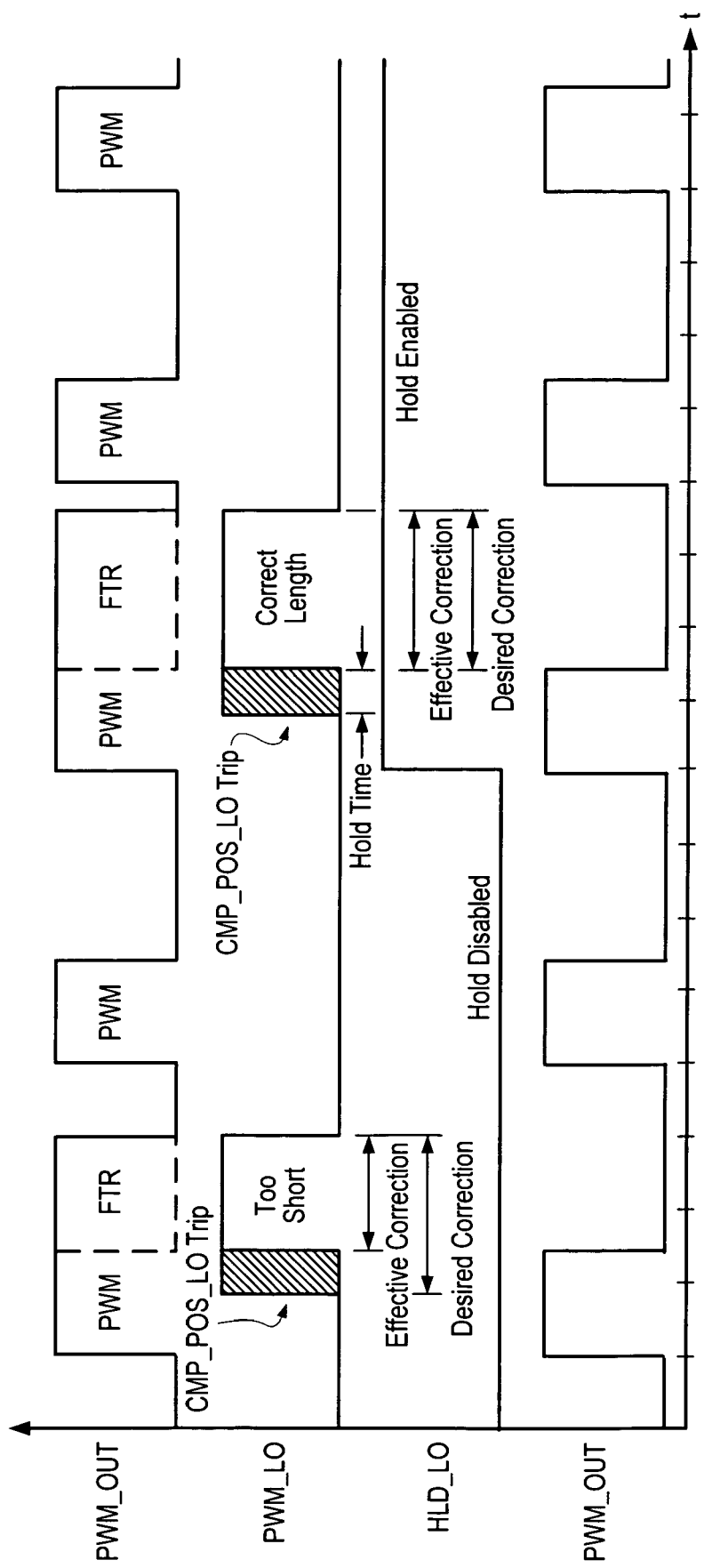
FIG. 13 illustrates timing diagrams comparing generation of correction pulses with and without a hold mechanism, according to one embodiment.

As illustrated in the embodiment of FIG. 13, holding the count corresponding to one or more of the timeout counters due to an active PWM pulse may delay the completion of the corresponding timeout correction pulse, such that the pulse is not partially overlapped by the concurrent same-polarity PWM pulse. In other words, this hold feature may cause the timeout correction pulse to be "stretched" so that the full length of the programmed timeout correction period occurs outside the active PWM pulse, if one happens to overlap the requested correction. The timeout correction pulse (e.g., a low band timeout correction pulse) is merged with the PWM output signal to adjust the power converter output voltage, and thereby adjust the error signal to a level within the corresponding threshold, e.g., a low band threshold, which may end the detected error condition. FIG. 13 illustrates timing diagrams that compare pulse generation of the NLR_POS_LO signal with and without the hold mode enabled, according to one embodiment. It is noted, however, that in some embodiments, the hold mechanism may delay the generation of the timeout correction pulse until the end of the PWM output pulse to prevent overlapping the correction pulse and the PWM output pulse. It is further noted that in various embodiments the correction pulse that is delayed by the hold mechanism and that is merged with the PWM output pulse may be formed by a low band timeout correction pulse and a high band timeout correction pulse, for example, in the case illustrated in FIG. 11B.

The hold feature may be programmable for high and low band corrections, so it can be tuned to the dynamics of the system. It is further noted that the hold control bits may be grouped into either high and low bands or positive and negative polarities. Although grouping the hold control bits into high and low bands may be most beneficial, since they then operate symmetrically for both loading and unloading load transients. The hold feature may maximize the effectiveness of the timed correction, when enabled, since it may deliver an additional inductor current step change over and above that available via a normal (and likely much smaller) PWM duty cycle increment. It is noted that in various embodiments the hold feature may be implemented by other means.

As shown in FIG. 11A and FIG. 11B, after a particular low or high band timeout correction period occurs, subsequent events may be "blanked" by POS blanking timeout counter 1256 (or the NEG blanking timeout counter), which, when activated, prevents re-triggering of the timeout control logic for a certain predetermined period of time. In one embodiment, the predetermined period of time associated with the blanking period may be programmable. In some embodiments, this blanking feature may prevent what may be termed "Hysteretic Oscillation", which may involve the nonlinear correction logic completely taking control of the PWM loop, and permanently overriding the PID duty cycle calculator output. Properly programmed timeouts and POS/NEG blanking intervals may prevent this form of continuous re-triggering.

As illustrated in FIG. 12, POS blanking timeout counter 1256 may be enabled by a falling edge on either the FTRN-LR_POS_LO or NLR_POS_HI outputs. The NEG section may behave in a similar fashion, but references will only be made to the POS section for simplicity. NEG edge detectors 1254A and 1254B are used to determine when either an NLR_POS_LO or an NLR_POS_HI pulse has ended. When the end of a correction pulse is detected, NEG edge detectors 1254A and 1254B will cause either the HI or LO SR blanking flip-flops 1255A and 1255B to change state, with the Q output going to logic "1". The enabled signal passes through OR gate 1285 and removes the !CLR signal to the blanking timeout counter 1256, which allows it to start counting. One of the inputs of AND gates 1282A and 1282C, which are used to drive the !CLR input control line of each pulse timeout counter 1251A and 1251B, is used to facilitate blanking of subsequent correction events. The AND gates 1282A and 1282C are fed from the !Q outputs of the two SR blanking flip-flops 1255A and 1255B, one of which will go to a logic "0" when the blanking timeout counter 1256 is activated. The logic "0" prevents generation of the corresponding timeout correction pulse.

The POS blanking comparator 1258 (and also the NEG blanking comparator) uses a similar low active !A>B magnitude comparator arrangement to the pulse timeout logic. When the count exceeds the programmed value of blanking register 1257, NEG edge detector 1254C on the magnitude comparator output causes both SR flip-flops 1255A and 1255B to be reset, thus terminating the active blanking interval. After either a POS or NEG blanking timeout interval has expired, the correction logic may then return to an "armed" (but quiescent) state ready to process the next timeout request, which will be triggered by the transient detection circuitry.

In some embodiments, the POS and NEG blanking counters may be used to blank POS and NEG timeouts individually. It is noted, however, that in other embodiments additional logic may be added to generate a pair of combined global blanking signals for both POS and NEG timeouts, via a selectable "BLANK_ALL" feature. In alternative embodiments, separate blanking counters and corresponding logic may be included to generate each of the low band and high band blanking periods. It is noted, however, that in various embodiments the blanking function may be implemented by other mechanisms.

As described previously (FIG. 11A), the issuance of an NLR_POS_LO pulse (or NLR_NEG_LO pulse) may be followed a short time later by an NLR_POS_HI pulse (or NLR_NEG_LO pulse). The generation of the NLR_POS_HI pulse may terminate the low band blanking period if the high band threshold is crossed during this particular blanking period. The control logic allows the blanking timeout counting to be terminated as soon as the NLR_HI timeout pulse (i.e., NLR_POS_LO pulse or NLR_NEG_LO pulse) is triggered by the corresponding high band comparator (e.g., POS_HI comparator 1253A). As depicted in the illustrated embodiment of FIG. 12, the POS edge detector 1254D detects the rising edge of the NLR_HI pulse and resets the LO SR flip-flop 1255B via OR gate 1284. This action clears blanking timeout counter 1256 back to zero, which in turn terminates the low band blanking period. Blanking timeout counter 1256 may then be ready to initiate a high band blanking period of a predetermined amount of time, e.g., on the falling edge of the NLR_HI output. It is noted that in some embodiments the initiation of the high band blanking period includes changing the state of both the BLANK_POS_HI and BLANK_POS_LO signals to prevent generation of both low band and high band correction pulses during the predetermined amount of time.

Referring back to FIG. 7, in one embodiment, the POS_LO and POS_HI comparators 725A and 725B may initiate a timed correction that may turn on the high-side MOSFET in the power stage 766 and turn off the low-side device. This may cause a positive AIL correction to be applied which forces the inductor current to ramp up by an amount dictated by the length of the POS_LO and POS_HI timeouts respectively, and the inductor current up-slope slew rate. Likewise, the NEG_LO and NEG_HI comparators 725C and 725D may initiate a timed correction that may turn on the low-side MOSFET in the power stage 766 and turn off the high-side device. This may cause a negative AIL correction to be applied which forces the inductor current to ramp down by an amount dictated by the length of the NEG_LO and NEG_HI timeouts, respectively, and the inductor current down-slope slew rate.

The dual band detection arrangement described above may allow at least two differing levels of $\Delta I_L$ correction to be applied, depending on how far the error voltage deviates from the nominal zero error point, e.g., during an output current transient. Varying load current steps may cause just a single low band correction, or if large enough, then a low band correction followed by a high band correction in rapid succession (FIG. 11A). If the output deviates quickly enough (i.e. if the high band threshold is crossed during a low band timeout), then the low and high band timeout correction pulses may be automatically concatenated by the timeout control logic into a single larger timeout correction pulse, as described previously (FIG. 11B). In one embodiment, this larger timeout correction pulse may be equal in width to the sum of the low band and high band timeout correction pulses.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A power converter comprising:
   error generation circuitry configured to generate an error signal based on the difference between a power converter output voltage and a reference voltage;
   transient detection circuitry configured to detect whether the error signal exceeds at least a first threshold; and
   timing control logic coupled to the transient detection circuitry, wherein in response to the error signal exceeding the first threshold, the timing control logic is configured to generate a low band timeout correction pulse to adjust the power converter output voltage, and thereby adjust the error signal to a level within the first threshold;
   wherein in response to the error signal exceeding a second threshold during the low band timeout correction pulse, the timing control logic is configured to generate a high band timeout correction pulse following the low band timeout correction pulse to adjust the power converter output voltage, and thereby adjust the error signal to a level within the second threshold;
   wherein the timing control logic is further configured to initiate a high band blanking period following the high band timeout correction pulse.

2. The power converter of claim 1, wherein the timing control logic is further configured to initiate a low band blanking period following the low band timeout correction pulse.

3. A power converter comprising:
   error generation circuitry configured to generate an error signal based on the difference between a power converter output voltage and a reference voltage;
   transient detection circuitry configured to detect whether the error signal exceeds at least a first threshold; and
   timing control logic coupled to the transient detection circuitry, wherein in response to the error signal exceeding the first threshold, the timing control logic is configured to generate a low band timeout correction pulse to adjust the power converter output voltage, and thereby adjust the error signal to a level within the first threshold;
   wherein the timing control logic is further configured to initiate a low band blanking period following the low band timeout correction pulse;
   wherein in response to the error signal exceeding a second threshold during the low band blanking period that follows the low band timeout correction pulse, the timing control logic is configured to generate a high band timeout correction pulse to adjust the power converter output voltage, and thereby adjust the error signal to a level within the second threshold, wherein the generation of the high band timeout correction pulse terminates the low band blanking period;
   wherein the timing control logic is further configured to initiate a high band blanking period following the high band timeout correction pulse.

4. The power converter of claim 1, wherein the low band timeout correction pulse is of a first predetermined pulse width and the high band timeout correction pulse is of a second predetermined pulse width, wherein the timing control logic is configured to terminate an active correction period associated with the low band timeout correction pulse after a time period corresponding to the first predetermined pulse width and the timing control logic is configured to terminate an active correction period associated with the high band timeout correction pulse after a time period associated with the second predetermined pulse width.

5. The power converter of claim 1, wherein in response to the error signal returning to a level within the second threshold, the timing control logic is configured to terminate an active correction period associated with the high band timeout correction pulse, and in response to the error signal returning to a level within the first threshold, the timing control logic is configured to terminate an active correction period associated with the low band timeout correction pulse.

6. The power converter of claim 4, wherein the timing control circuit includes a timeout correction pulse feedback mechanism operable to prevent generation of a high band timeout correction pulse when a low band timeout correction pulse is active, and operable to prevent generation of a low band timeout correction pulse when a high band timeout correction pulse is active.

7. The power converter of claim 1, wherein the transient detection circuitry includes a plurality of comparators operable to receive the error signal from the error generation circuitry, wherein the comparators are configured to detect whether the error signal exceeds a plurality of thresholds.

8. A power converter comprising:
error generation circuitry configured to generate an error signal based on the difference between a power converter output voltage and a reference voltage;
transient detection circuitry including a plurality of comparators operable to receive the error signal from the error generation circuitry, wherein the comparators are configured to detect whether the error signal exceeds a plurality of thresholds including a low band threshold; and
timing control logic coupled to the transient detection circuitry, wherein in response to the error signal exceeding the low band threshold, the timing control logic is configured to generate at least one correction pulse to adjust the power converter output voltage, and thereby adjust the error signal to a level within the low band threshold;
wherein the timing control logic is further configured to initiate a blanking period following the at least one correction pulse;
wherein the transient detection circuitry includes:
a first comparator configured to compare the error signal to a low band positive threshold, wherein in response to the error signal exceeding the low band positive threshold, the first comparator is configured to enable a low band positive indication signal to indicate an error condition;
a second comparator configured to compare the error signal to a high band positive threshold, wherein in response to the error signal exceeding the high band positive threshold, the second comparator is configured to enable a high band positive indication signal to indicate an error condition;
a third comparator configured to compare the error signal to a low band negative threshold, wherein in response to the error signal exceeding the low band negative threshold, the third comparator is configured to enable a low band negative indication signal to indicate an error condition; and
a fourth comparator configured to compare the error signal to a high band negative threshold, wherein in response to the error signal exceeding the high band negative threshold, the fourth comparator is configured to enable a high band negative indication signal to indicate an error condition.

9. A power converter comprising:
error generation circuitry configured to generate an error signal based on the difference between a power converter output voltage and a reference voltage;
transient detection circuitry including a plurality of comparators operable to receive the error signal from the error generation circuitry, wherein the comparators are configured to detect whether the error signal exceeds a plurality of thresholds including a first threshold; and
timing control logic coupled to the transient detection circuitry, wherein in response to the error signal exceeding the first threshold, the timing control logic is configured to generate at least one correction pulse to adjust the power converter output voltage, and thereby adjust the error signal to a level within the first threshold;
wherein the timing control logic is further configured to initiate a blanking period following the at least one correction pulse;
wherein each of a first subset of the plurality of comparators is configured to compare the error signal to at least the first threshold, wherein at least the first threshold comparators include a built-in analog hysteresis of a predetermined amount to implement a delayed turn-off threshold.

10. The power converter of claim 9, wherein the transient detection circuitry further includes hysteresis logic circuitry coupled to a second subset of the plurality of comparators, wherein the hysteresis logic circuitry is operable to add a hysteresis-like function that implements a delayed turn-off threshold for each output of the second subset of the plurality of comparators.

11. The power converter of claim 10, wherein the hysteresis logic circuitry is also coupled to each output of the first subset of the plurality of comparators, wherein each of the delayed turn-off thresholds associated with the outputs of the second subset of the plurality of comparators is dependent upon the turn-off threshold of a corresponding comparator of the first subset of the plurality of comparators.

12. The power converter of claim 10, wherein the second subset of the plurality of comparators also include analog hysteresis of a predetermined amount.

13. The power converter of claim 11, wherein said analog hysteresis is programmable.

14. A power converter comprising:
error generation circuitry configured to generate an error signal based on the difference between a power converter output voltage and a reference voltage;
transient detection circuitry configured to detect whether the error signal exceeds at least a first threshold;
timing control logic coupled to the transient detection circuitry, wherein in response to the error signal exceeding the first threshold, the timing control logic is configured to generate at least one correction pulse; and
a control loop including a pulse width modulator (PWM) configured to generate at least one PWM output pulse, wherein the PWM output pulse is combined with the at least one correction pulse to adjust the power converter output voltage, and thereby adjust the error signal to a level within the first threshold;
wherein the timing control logic is further configured to initiate a blanking period following the at least one correction pulse.

15. The power converter of claim 14, further comprising a hold mechanism configured to detect the state of the PWM output pulse, wherein the hold mechanism is configured to delay completion of the at least one correction pulse to prevent overlapping the at least one correction pulse and the PWM output pulse.

16. A method for controlling a power converter, the method comprising:
   generating an error signal based on the difference between a power converter output voltage and a reference voltage;
   detecting whether the error signal exceeds at least a first threshold;
   in response to the error signal exceeding the first threshold, generating a low band timeout correction pulse to adjust the power converter output voltage, and thereby adjust the error signal to a level within the first threshold; and
   in response to the error signal exceeding a second threshold during the low band timeout correction pulse, generating a high band timeout correction pulse to adjust the power converter output voltage, and thereby adjust the error signal to a level within the second threshold, and initiating a high band blanking period following the high band timeout correction pulse.

17. The method of claim 16, further comprising initiating a low band blanking period following the low band timeout correction pulse.

18. A method for controlling a power converter, the method comprising:
   generating an error signal based on the difference between a power converter output voltage and a reference voltage;
   detecting whether the error signal exceeds at least a first threshold;
   in response to the error signal exceeding the first threshold, generating a low band timeout correction pulse to adjust the power converter output voltage, and thereby adjust the error signal to a level within the first threshold, and initiating a low band blanking period following the low band timeout correction pulse; and
   in response to the error signal exceeding a second threshold during the low band blanking period that follows the low band timeout correction pulse, generating a high band timeout correction pulse to adjust the power converter output voltage, and thereby adjust the error signal to a level within the second threshold, terminating the low band blanking period, and initiating a high band blanking period following the high band timeout correction pulse.

19. The method of claim 18, further comprising preventing generation of a high band timeout correction pulse when a low band timeout correction pulse is active, and preventing generation of a low band timeout correction pulse when a high band timeout correction pulse is active.

20. A power distribution system comprising:
   a system bus; and
   a plurality of power converters coupled to the system bus, wherein each power converter comprises:
      error generation circuitry configured to generate an error signal based on the difference between a power converter output voltage and a reference voltage;
      transient detection circuitry configured to detect whether the error signal exceeds at least a first threshold;
      timing control logic coupled to the transient detection circuitry, wherein in response to the error signal exceeding the first threshold, the timing control logic is configured to generate at least one correction pulse; and
   a control loop including a pulse width modulator (PWM) configured to generate at least one PWM output pulse, wherein the PWM output pulse is combined with the at least one correction pulse to adjust the power converter output voltage, and thereby adjust the error signal to a level within the first threshold;
   wherein the timing control logic is further configured to initiate a blanking period following the at least one correction pulse.

* * * * *